United States Patent

Takeda et al.

[11] Patent Number: 5,932,354
[45] Date of Patent: Aug. 3, 1999

[54] OBLIQUELY DEPOSITED FILM ELEMENT

[75] Inventors: Yasuhiko Takeda, Aichi-ken; Tomoyoshi Motohiro, Seto; Tatsumi Hioki, Nagoya; Shoji Noda, Aichi-ken; Mikio Okamoto, Yokohama; Hiroshi Niikura, Kanagawa-ken, all of Japan

[73] Assignees: Kabushiki Kaisha Toyota Chuo Kenkyusho, Aichi-ken; Nikon Corporation, Tokyo, both of Japan

[21] Appl. No.: 08/893,510

[22] Filed: Jul. 11, 1997

[30] Foreign Application Priority Data

Jul. 11, 1996 [JP] Japan .................................. 8-182494

[51] Int. Cl.$^6$ ...................................................... B32B 17/00
[52] U.S. Cl. ........................ 428/426; 428/428; 428/432; 428/696; 428/701; 428/702; 359/359
[58] Field of Search .................................... 428/426, 428, 428/432, 696, 701, 702; 359/359

[56] References Cited

U.S. PATENT DOCUMENTS 4,813,768   3/1989   Hamaguchi et al. ................... 349/195
4,874,664  10/1989   Hamaguchi et al. ................... 428/325

*Primary Examiner*—Timothy M. Speer
*Attorney, Agent, or Firm*—Oblon, Spivak, McClelland, Maier & Neustadt, P.C.

[57] ABSTRACT

By providing a normally deposited layer as a buffer layer between a substrate and an obliquely deposited layer, it is possible to prevent contaminants on the substrate from diffusing into the obliquely deposited layer. Also, by providing a normally deposited layer as a passivation layer on the uppermost obliquely deposited layer, absorption of water vapor in the air by the obliquely deposited layer is prevented. Further, by forming a laminated object comprising obliquely deposited layers and dense normally deposited layers, strength of each obliquely deposited layer itself is increased and relaxation of its columnar structure can be suppressed with certainty because both the diffusion of contaminants from the substrate and the absorption of water in the air is prevented. Thus, by removing factors to accelerate the relaxation of columnar structure in the obliquely deposited layer, clouding of the obliquely deposited film layer can be prevented.

14 Claims, 7 Drawing Sheets

SAMPLE D

SAMPLE C

SAMPLE F

SAMPLE E

OBLIQUELY DEPOSITED FILM ELEMENT

BACKGROUND OF THE INVENTION

1. Field of the Invention

The present invention relates to an obliquely deposited film element having an obliquely deposited layer which is formed on a substrate, especially used for a polarization element or the like, an important constituent in optical communication, photo detection, light processing, and the like.

2. Description of the Related Art

Heretofore, in the field of optical communication, photo detection, light processing, and the like, control of light phase has been necessary. Therefore, phase control elements of various kinds have been used. One of these phase control elements is an obliquely deposited film element in which an obliquely deposited film is used.

The obliquely deposited film comprises columns with a thickness of approximately 10 nm, which aggregate at an angle inclined to the direction of an deposition source from the normal of the substrate surface and form an anisotropic fine structure inside the plane of the film. Due to such an anisotropic dense structure, various physical properties inside the plane of the film have anisotropy.

For example, an obliquely deposited film made of $Ta_2O_5$, a substance which is transparent to visible light, has a double refraction characteristic to vertical incident light. Therefore, this obliquely deposited film is used for a phase plate in a sphere of visible light.

An obliquely deposited film often has a problem of relaxation of a columnar structure, in other words, coagulation in each of columns which constitute the aforementioned dense structure. Relaxation of columnar structure causes scattering of light in the film, thereby clouding the film. Therefore, the characteristic of the film changes and quality of an optical element, such as a phase plate, deteriorates.

Methods for avoiding such clouding to some extent are known. For example, it is known that by removing contaminants on a substrate to the utmost and performing high speed oblique deposition of the $Ta_2O_5$ in a high vacuum, relaxation of the columnar structure in the obliquely deposited film is diminished and a less cloudy film element under visible light is produced.

However, with regard to an obliquely deposited film element produced in the manner mentioned above, sufficient durability has yet to be obtained under severe circumstances, such as high temperature or high humidity.

In several fields which require utilization of light, it is expected that a wavelength of light is shortened for the purposes of improving resolution or the like. However, $Ta_2O_5$, which is the material for the film of the aforementioned obliquely deposited film element, absorbs light with a wavelength of 450 nm or less. Therefore, the $Ta_2O_5$ cannot be used for a phase plate which is applied to ultraviolet light.

On the other hand, a method for avoiding the clouding of an obliquely deposited film including a substance transparent to ultraviolet light, such as $SiO_2$, is not yet known.

The present invention is directed to providing an obliquely deposited film element which prevents the relaxation and clouding of the columnar structure of an obliquely deposited film and scarcely relies on the substance used as a film material.

SUMMARY OF THE INVENTION

Constitution of the Invention

The present invention is made in order to achieve the aforementioned goal and has the following characteristics:

(A) An obliquely deposited film element of the present invention comprises a substrate, and alternately deposited layers on the substrate, the alternately deposited layers being an obliquely deposited layer and a normally deposited layer with respect to the substrate without special orders, the uppermost layer of the alternately deposited layers being a normally deposited layer, provided that the lowermost layer of the alternately deposited layers is an obliquely deposited layer. Note that a "normally deposited layer" means a layer which is formed by deposition in a direction of the normal of a substrate.

(B) An obliquely deposited film element in another embodiment of the present invention comprises a substrate, and alternately deposited layers on the substrate, the alternately deposited layers being at least two obliquely deposited layers and at least two normally deposited layers with respect to the substrate without special orders, the uppermost layer of the alternately deposited layers being a normally deposited layer, provided that the lowermost layer of the alternately deposited layers is an obliquely deposited layer.

(C) An obliquely deposited film element of multilayered structure (e. g. a substrate/a normally deposited layer/an obliquely deposited layer/a normally deposited layer/an obliquely deposited layer/ . . . /a normally deposited layer/an obliquely deposited layer/a normally deposited layer) in the present invention can be obtained according to the following processes:

(i) First, a normally deposited layer (buffer layer) is formed on a substrate by normal deposition so as to obtain a clean surface.

(ii) Second, obliquely deposited layers and normally deposited layers are alternately stacked and a laminated object of multilayered structure (an obliquely deposited layer/a normally deposited layer/an obliquely deposited layer/ . . . /an obliquely deposited layer) is formed on the aforementioned buffer layer so that a desired thickness is attained.

(iii) A normally deposited layer is further formed as a dense passivation layer on the surface of the aforementioned laminated object.

(D) In Japanese Patent Laid-Open Publication No. Sho 63-301905 (JPA 63-301905), in order to improve mechanical strength of the obliquely deposited film, a normally deposited layer is formed between two obliquely deposited layers. That is, a constitution of "a substrate/an obliquely deposited layer/a normally deposited layer/an obliquely deposited layer" is provided.

However, the constitution shown in this prior art is not sufficient for preventing clouding of the obliquely deposited layer. Therefore, a constitution according to the present invention is required.

More specifically, an obliquely deposited film element is constituted in the present invention in such a manner that normally deposited layers are provided at least either (i) between a substrate and an obliquely deposited layer or (ii) on the surface of an obliquely deposited layer, in concrete, on ". . . an obliquely deposited layer/a normally deposited layer/an obliquely deposited layer" or on "a single obliquely deposited layer."

With this constitution, cloudiness can be avoided with certainty for each obliquely deposited layer. Specifically, if the laminated object of multilayered structure given in item (B) has a constitution in which thin obliquely deposited layers and thin normally deposited layers are alternately stacked, it will be particularly effective in preventing cloudiness.

(E) Obliquely deposited layers in the obliquely deposited film element described above, in concrete, can have the following constitution, for example:

(i) substrate/normally deposited layer/obliquely deposited layer (ii) substrate/obliquely deposited layer/normally deposited layer (iii) substrate/normally deposited layer/obliquely deposited layer/normally deposited layer (iv) substrate/normally deposited layer/obliquely deposited layer/normally deposited layer/obliquely deposited layer . . . /normally deposited layer/obliquely deposited layer.

(v) substrate/normally deposited layer/obliquely deposited layer/normally deposited layer/obliquely deposited layer . . . /normally deposited layer.

(F) In the obliquely deposited film element described above, a tantalum oxide, a cerium oxide, a tungsten oxide, a silicon oxide, neodymium fluoride, or the like can be used as at least one material for forming an obliquely deposited layer and a normally deposited layer. If an obliquely deposited layer and a normally deposited layer are formed using any one of these materials, so-called clouding of the obliquely deposited layer can be prevented. The material for an obliquely deposited layer and a normally deposited layer will not be restricted to the aforementioned materials if it is transparent to light to be used and can be stably formed on a substrate.

(G) In the obliquely deposited film element described above, it is preferable that each depositing direction of the obliquely deposited layers is 30 to 80 degrees against the normal of the substrate surface. Such a deposition angle causes differences among various polarized light in refractive index of incident light which enters into the obliquely deposited film element. Therefore, the obliquely deposited film element can be used as a phase control element.

(H) Also, the obliquely deposited film element described above can be used as a phase control element in various optical devices (for example, a phase plate or a polarization beam splitter element), and, by using the obliquely deposited film element of the present invention as an optical element like that, it is possible to realize a high-performance optical device.

It is considered that relaxation and clouding of the columnar structure of an obliquely deposited film arise because the obliquely deposited layer in the film has dense structure with numerous apertures and the structure itself is unstable and easy to relax.

Examples of factors for accelerating relaxation of such structure include: (i) contaminants on a substrate and (ii) osmosis of water from the air into an obliquely deposited layer through its surface.

By removing the aforementioned factors, the present invention prevents so-called clouding of an obliquely deposited layer comprising various materials. More specifically, as described above, in the present invention, diffusion of contaminants on a substrate into the obliquely deposited layer is prevented by providing a normally deposited layer as a buffer layer between the substrate and the obliquely deposited layer. Further, by providing a normally deposited layer as a passivation layer on the uppermost obliquely deposited layer, absorption of water from the air by the obliquely deposited layer is prevented.

In addition to the constitution described above, by forming a laminated object in which an obliquely deposited layer is arranged between two dense normally deposited layers as described in item (B), mechanical strength of each obliquely deposited layer is increased, and relaxation of structure can be suppressed with further certainty while it removes the aforementioned factors (i) and (ii).

DESCRIPTION OF THE PREFERRED EMBODIMENTS

Embodiments of the present invention will be subsequently described with reference to the attached drawings.

First Embodiment
Structure of Obliquely Deposited Film Element

Figure 1A:
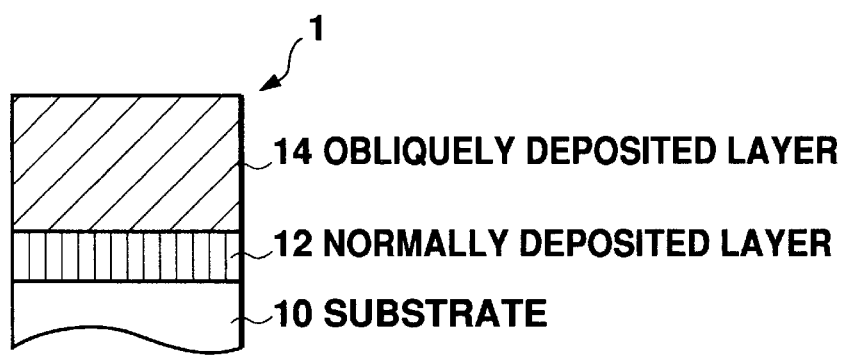
FIGS. 1A, 1B, and 1C are schematic sectional views which show examples of the constitution of an obliquely deposited film element according to a first embodiment of the present invention.
Figure 1B:
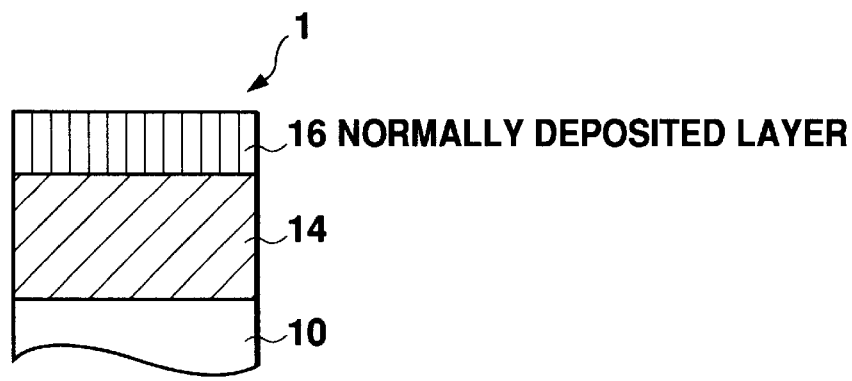
Figure 1C:
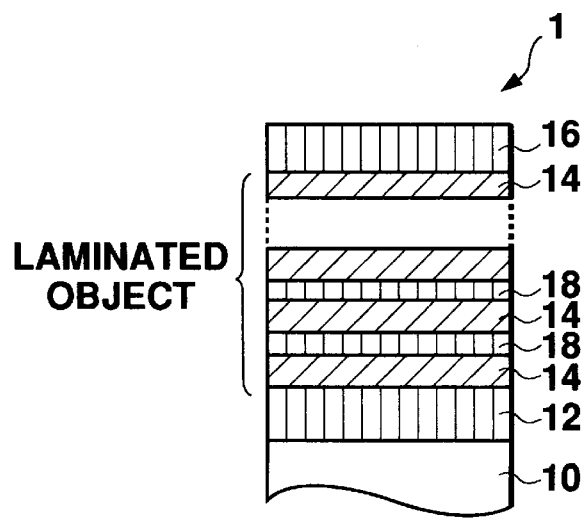

FIGS. 1A, 1B, and 1C show examples of constitutions 1, 2, and 3 of an obliquely deposited film element according to a first embodiment. As shown in the drawings, each obliquely deposited film element is constituted in such a manner that a normally deposited layer 12 and an obliquely deposited layer 14 are formed on a transparent substrate 10, such as a fused silica.

EXAMPLE OF CONSTITUTION 1

In an obliquely deposited film element 1 shown in FIG. 1A, a normally deposited layer 12 is formed on the surface of the substrate 10 as a buffer layer. The normally deposited layer 12 is formed by deposition in a direction of the normal of the aforementioned surface, with a thickness of approximately 2800 Å, for example. An obliquely deposited layer 14 of 2 $\mu$m in thickness is formed on the normally deposited layer 12 in such a manner that a direction of the deposition is inclined with respect to the normal of the surface within a range of, for example, 30 to 80 degrees.

The normally deposited layer 12 has a dense structure in which contaminants do not easily diffuse. Contaminants on the substrate 10 may reach and diffuse into the obliquely deposited layer 14, which leads to relaxation of the columnar structure of the obliquely deposited layer 14. However, this can be prevented by providing the normally deposited layer 12 between the substrate 10 and the obliquely deposited layer 14.

EXAMPLE OF CONSTITUTION 2

The obliquely deposited film element 1 shown in FIG. 1B has an obliquely deposited layer 14 of approximately 2 $\mu$m in thickness, for example, which is formed on a surface of a substrate 10 cleaned in advance. On the obliquely deposited layer 14, a normally deposited layer 16 of 2800 Å in thickness, for example, is formed as a passivation layer. The normally deposited layer 16 has a similar dense structure to that of the normally deposited layer 12 shown in FIG. 1A which is used as a buffer layer. Consequently, the normally deposited layer 16 prevents the lower obliquely deposited layer 14 from absorbing water in the air and relaxing its columnar structure.

EXAMPLE OF CONSTITUTION 3

In the obliquely deposited film element 1 shown in FIG. 1C, a normally deposited layer 12 (with a thickness of 2800 Å, for example) is formed on a substrate 10 as a buffer layer. A laminated object in which thin obliquely deposited layers 14 (with a thickness of 750 Å, for example) and thin normally deposited layers 18 (with a thickness of 450 Å, for example) are alternately formed is provided on the normally deposited layer 12. Further, a normally deposited layer 16 is formed on the laminated object as a passivation layer same as in FIG. 1B. The constitution is not limited to one in which the laminated object (an obliquely deposited layer 14/a normally deposited layer 18/an obliquely deposited layer 14/ . . . /an obliquely deposited layer 14) is provided on the normally deposited layer 12. A single obliquely deposited layer 14 may be substituted for the aforementioned laminated object.

As described above, by providing the laminated object or the single obliquely deposited layer 14 sandwiched between the normally deposited layer 12 served as a buffer layer and the normally deposited layer 16 served as a passivation layer, it is possible to prevent with certainty (i) diffusion of contaminants from the substrate 10 and (ii) absorption of water in the air, factors which accelerate the structural relaxation of the obliquely deposited layer 14.

Therefore, so-called film cloudiness which may arise due to the structural relaxation of an obliquely deposited layer in an obliquely deposited film element is prevented with certainty. Further, if the laminated structure composed of thin obliquely deposited layers 14 and thin normally deposited layers 18 as shown in FIG. 1C is adopted, mechanical strength of a film will be improved, thereby further preventing clouding of the film.

Preparation Conditions

The obliquely deposited film element in the first embodiment can be used as a phase control element for vertical incident light. More specifically, in the obliquely deposited film element, there is a difference between a polarized component (S-polarized light), which is orthogonal to the evaporating direction shown in FIG. 2A, and a polarized component (P-polarized light), which is orthogonal to the S-polarized light, in refractive index of the incident light which vertically enters. Due to the difference in the refractive indices, a phase difference is made between the S-polarized light and the P-polarized light, both of which have passed the obliquely deposited film element 1. Then, in the obliquely deposited film element shown in the first embodiment, by adjusting a thickness of the obliquely deposited layer to a prescribed value, it is possible to give a desired phase difference between the aforementioned two polarized components. Therefore, this obliquely deposited film element can be used as a phase control element, for example, a phase plate or a polarization beam splitter element. When the obliquely deposited film element is used as a polarization beam splitter element, multilayered structure comprising obliquely deposited layers and normally deposited layers as shown in FIG. 1C is required.

Next, the preparation conditions of an obliquely deposited film element as a phase plate will be subsequently described.

First, a deposition material for forming an obliquely deposited layer and a normally deposited layer has to be a substance which is transparent to light. However, a substance having a larger refractive index is more advantageous. Substances, such as $Ta_2O_5$, $CeO_2$, and $WO_3$ are suitable for those from visible light to near infrared light and substances such as $SiO_2$ and $NdF_3$ are suitable for ultraviolet light.

No particular restriction is imposed on a method of deposition. Therefore, thermal evaporation, electron beam evaporation, sputtering, or the like can be adopted.

It is preferable that the depositing direction of an obliquely deposited layer inclines from the normal of the plane surface of an element by an deposition angle of 30 to 80 degrees. An obliquely deposited layer in which $Ta_2O_5$ or $SiO_2$ is obliquely deposited at a prescribed deposition angle gives a phase difference between two polarized components of incident light which vertically enters into the obliquely deposited film element as described above.

The temperature of a substrate at the time of deposition should be less than or equal to one-third of the melting point of an deposition substance. Usually, deposition can be performed at room temperature.

Figure 2B:
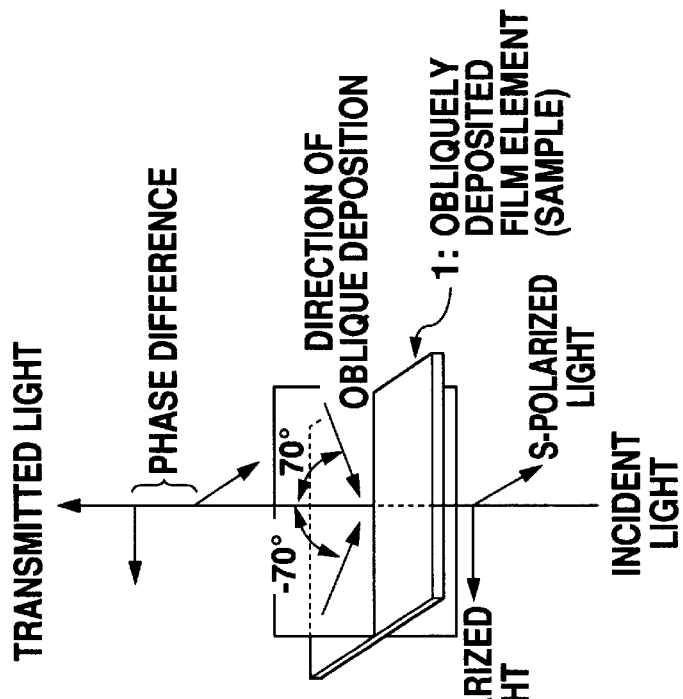
FIGS. 2A and 2B are conceptual drawings which show depositing directions and functions of the obliquely deposited film element of the present invention.
Figure 2A:
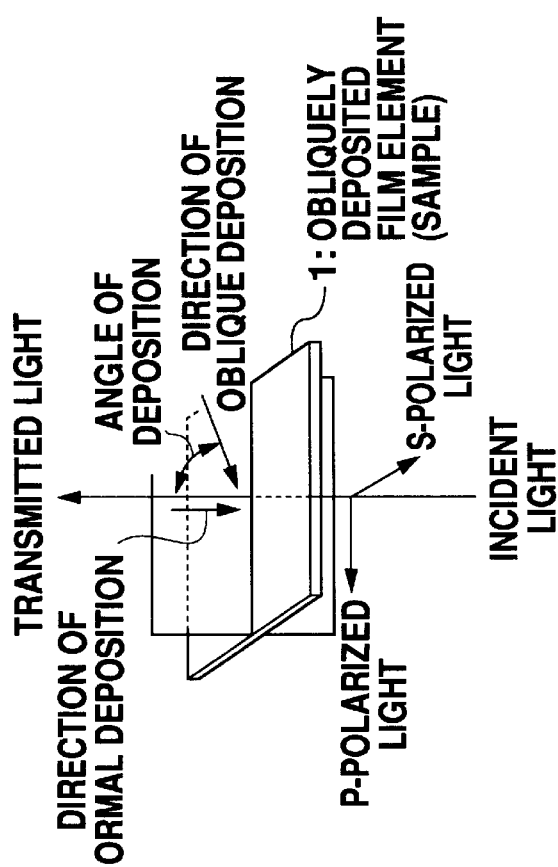
Figures 3A, 3B:
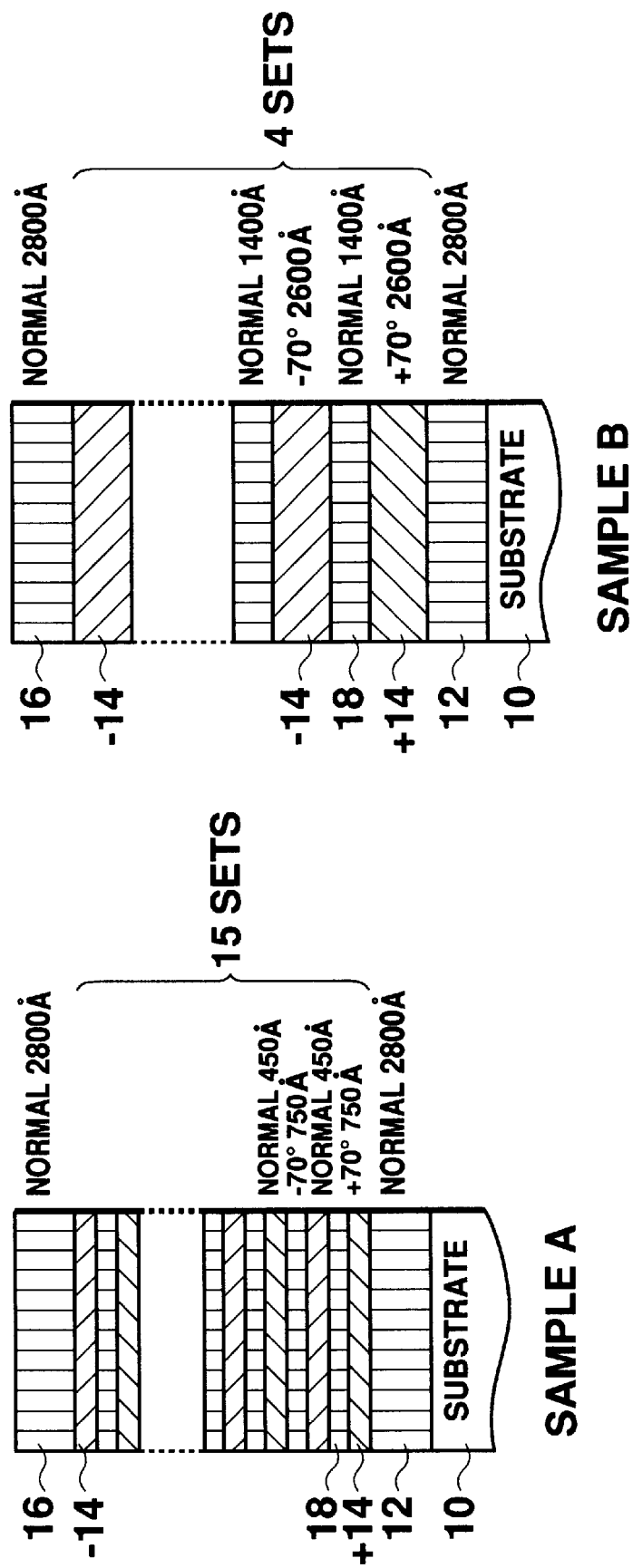
FIGS. 3A, 3B, 4A, 4B, 4C, and 4D are schematic sectional views showing the constitution of samples which are used for properties evaluation of an obliquely deposited film element of the present invention.
Figure 4B:
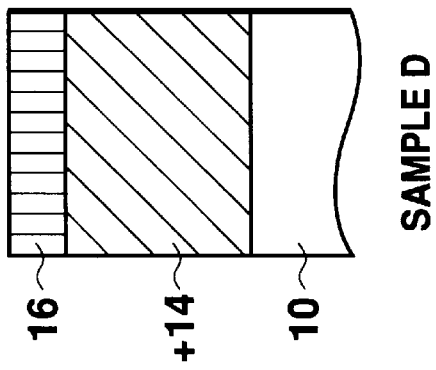
Figure 4A:
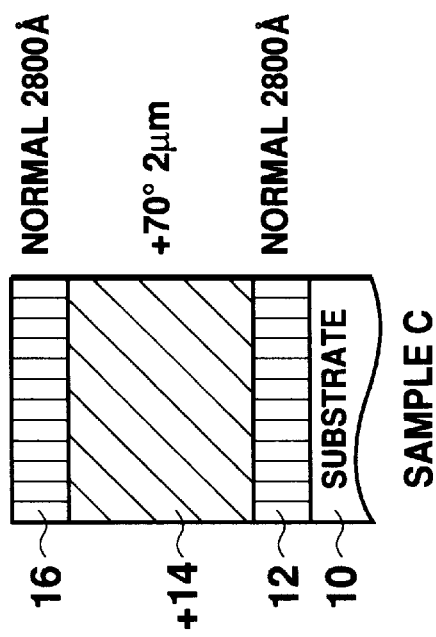
Figure 4D:
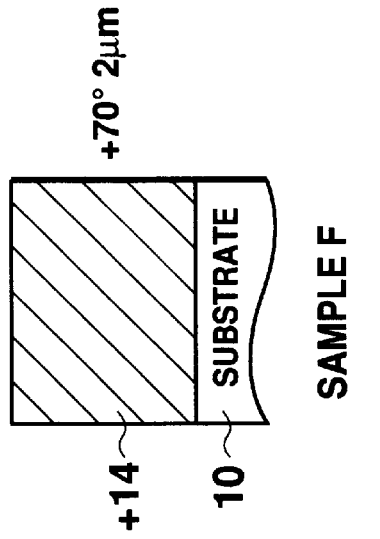
Figure 4C:
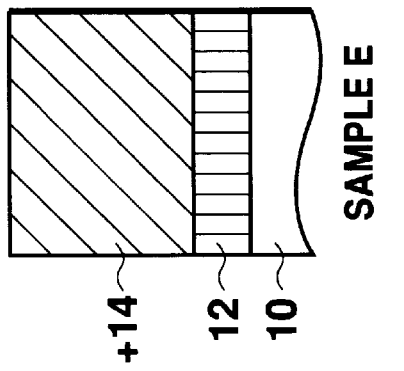

Further, conditions for forming the normally deposited layers 12, 16, and 18 shown in FIGS. 1A, 1B, and 1C, may be the same with those for forming the obliquely deposited layer, except that the deposition should be performed from a vertical direction, that is, at an deposition angle of zero degrees as shown in FIG. 2A.

Evaluation of Properties

Next, methods for evaluating properties of the obliquely deposited film element of the first embodiment served as a phase plate and results of the evaluation will be described.

An obliquely deposited layer and a normally deposited layer as mentioned above are formed by electron beam-evaporation of fused silica ($SiO_2$) on a substrate made of fused silica, and it is used as a phase plate for ultraviolet light (sample).

FIGS. 3A, 3B, 4A, 4B, 4C, and 4D show examples of sample constitution. First, with regard to samples A and B, a 2800 Å thick normally deposited layer 12 (buffer layer) is formed through normal deposition on the substrate 10. Subsequently, a laminated object is formed by repeated placement of an obliquely deposited layer +14 (angle of deposition+70 degrees), a normally deposited layer 18, an obliquely deposited layer −14 (angle of deposition−70 degrees), and a normally deposited layer 18. In the end, a 2800 Å thick normally deposited layer 16 (passivation layer) is formed.

Here, in sample A, a laminated object comprises 15 sets (on the top of the laminated object only an obliquely deposited layer is allowed), each of which comprises a 750 Å thick obliquely deposited layer +14, a 450 Å thick normally deposited layer 18, a 750 Å thick obliquely deposited layer −14, and again, a 450 Å thick normally deposited layer 18. On the other hand, sample B has a laminated object with four sets of layers (on the top there is an obliquely deposited layer). Each set comprises a 2600 Å thick obliquely deposited layer +14, a 1400 Å thick normally deposited layer 18, a 2600 Å thick obliquely deposited layer −14, and again, a 1400 Å thick normally deposited layer 18. It is possible to reduce the stress of the membranes by forming obliquely deposited layers ±14 into symmetric membrane with ±70 degrees of deposition angle.

Sample C comprises three layers: a 2800 Å thick normally deposited layer 12 as a buffer layer; a 2 μm thick obliquely deposited layer (70 degrees of deposition angle), and a normally deposited layer 16 as a passivation layer. This sample's obliquely deposited layer is structured, unlike samples A and B, without any normally deposited layer in the middle.

Sample D has a structure in which a 2800 Å thick normally deposited layer 16 is placed on a 2 μm thick obliquely deposited layer.

Sample E is structured in such a manner that a 2800 Å thick normally deposited layer 12 is placed between a 2 μm thick obliquely deposited layer and the substrate.

Finally, sample F is structured in such a manner that only a single obliquely deposited layer +14 with a thickness of 2 μm (angle of deposition+70 degrees) is formed on the substrate and does not contain any normally deposited layer.

By using the above-mentioned six samples A through F as samples 1 in FIG. 2B, incident light was vertically irradiated to each sample. With regard to the transmitted light, the phase difference between a polarized component (S-polarized light), which is orthogonal to the direction of evaporation, and a polarized component (P-polarized light), which is orthogonal to the S-polarized light, was measured. Also, a ratio of a loss of the transmitted P-polarized light to that of the transmitted S-polarized light, including both absorption and scattering caused by clouding, was measured.

Figure 5:
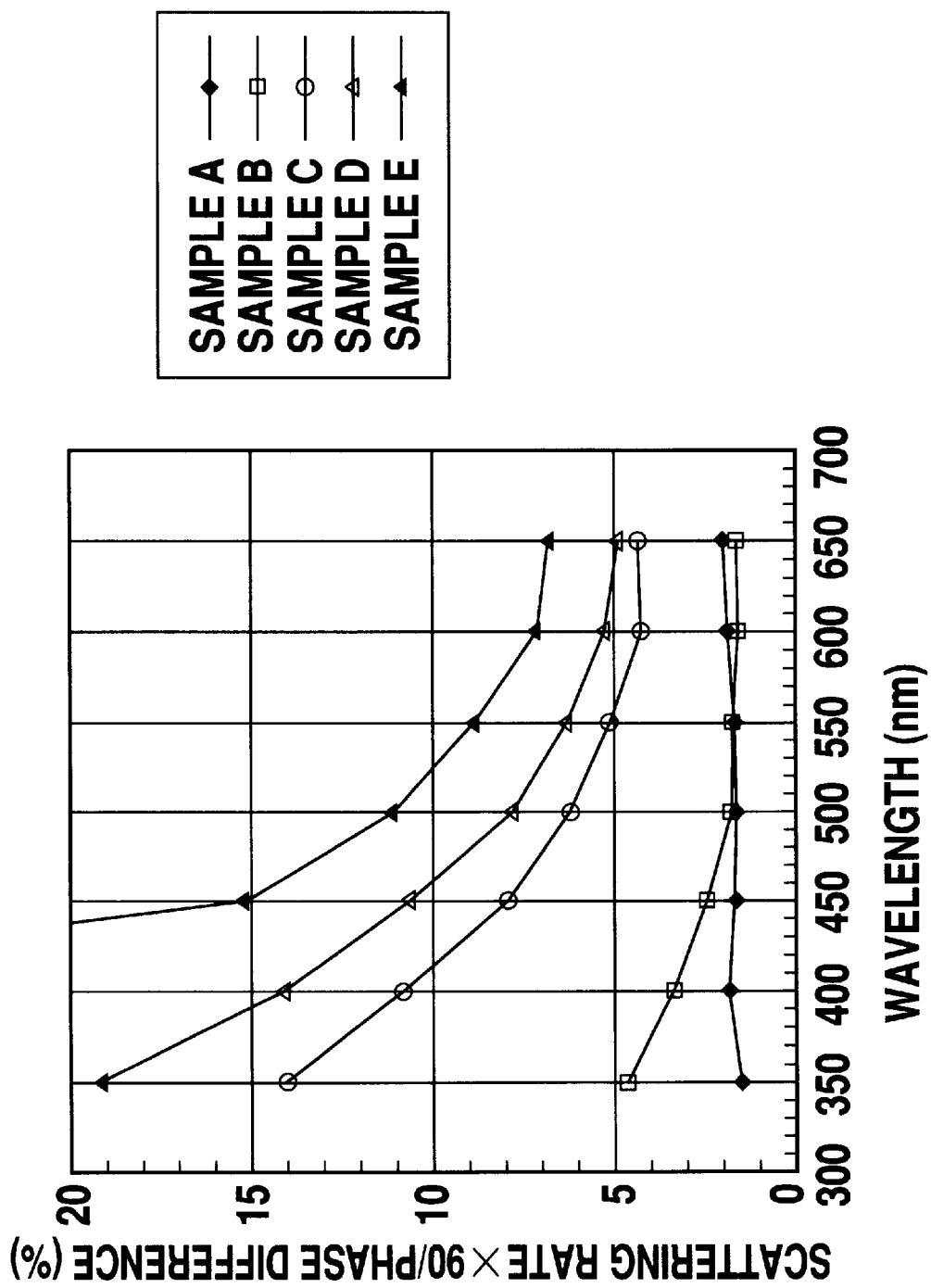
FIG. 5 shows a correlation between a ratio of light loss and a wavelength in each of the samples shown in FIGS. 3A, 3B, 4A, 4B, and 4C.

FIG. 5 shows the loss ratio for a 90 degree phase difference which is obtained by dividing light loss ratio by actual value (degree) of the phase difference and multiplying the result by 90 degrees.

As shown in FIG. 5, the sample with the smallest loss ratio is sample A. This sample has a buffer layer, a passivation layer, and thin obliquely deposited layers with the largest number of repetition of stacking of all the samples. In the sample A, a stably low loss ratio (approximately 1.8 percent in average) is observed in the range of the measured wavelength between 350 nm and 650 nm.

The sample that shows the second smallest loss ratio is sample B which has less repetition and relatively thick obliquely deposited layers. Sample B shows a higher loss ratio in comparison with that of sample A in the wavelength range between 350 nm and 500 nm, whereas in the longer wavelength range, more than 500 nm, it shows a low loss ratio similar to that of sample A.

The sample with the third smallest loss ratio is sample C which does not contain any normally deposited layer formed between obliquely deposited layers. As for sample F, its phase difference could not be measured accurately enough due to its large loss at the time of transmission. Samples D and E have a higher loss ratio at transmission than the samples A, B, and C. However, they are superior to sample F.

From the results described above, it can be concluded that the most effective method of preventing cloudiness of obliquely deposited layers is to form both a buffer layer and a passivation layer and further repeat stacking many thin obliquely deposited layers and normally deposited layers alternately.

Second Embodiment

Hereunder explained is the usage of the obliquely deposited film element, as shown in the aforementioned first embodiment of the present invention, as a phase plate (a quarter wavelength plate in this case).

Figure 6:
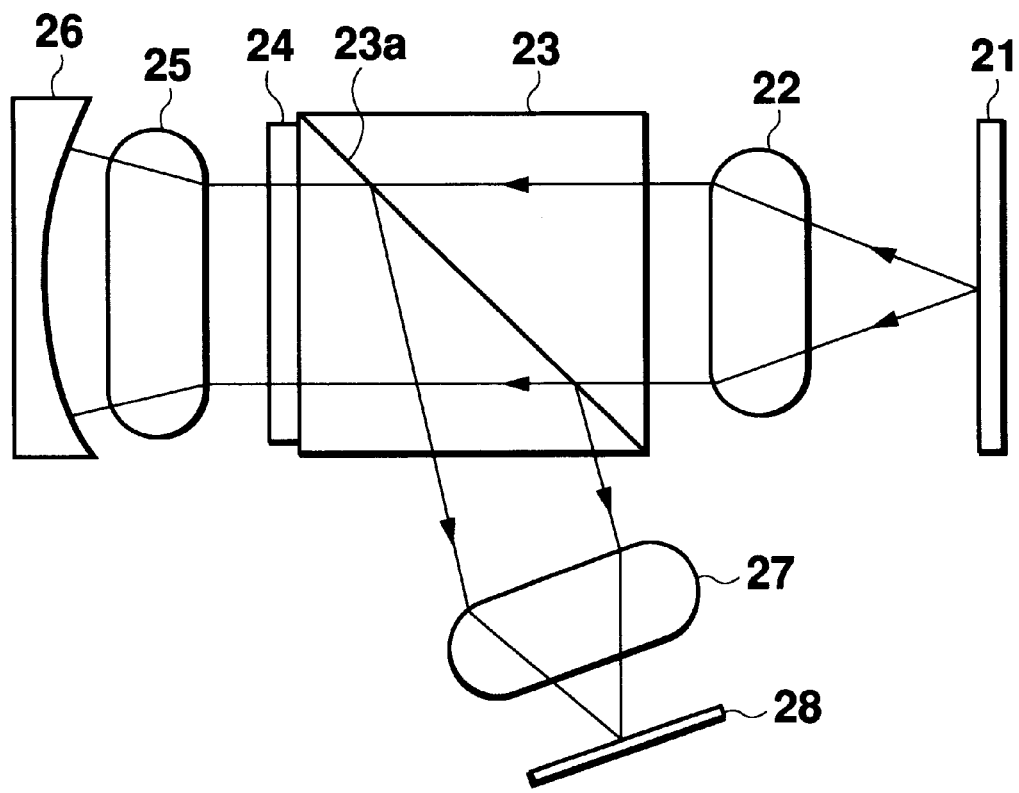
FIG. 6 shows an example of the constitution of an optical device according to a second embodiment of the present invention.

FIG. 6 shows an example of the obliquely deposited film element of the present invention used in an optical device which is given in Japanese Patent Laid-Open Publication No. Hei 3-282527 (JPA 3-282527). The optical device is an optical system for minifying a pattern on the first plane 21 and projecting it on the second plane 28. For example, it is used as an exposure device for producing semiconductor elements. In this case, the pattern on the first plane 21 is enlarged from an actual element pattern and it is minified and projected on the second plane 28 which is composed by semiconductor wafers.

An obliquely deposited film element as shown in the first embodiment is used as a quarter wavelength plate 24 at a plane of incidence and exit of a polarization beam splitter 23 in FIG. 6.

An outline of the optical device shown in FIG. 6 will be subsequently described.

The light from the first plane 21 is rendered to be parallel light by a first group of lenses 22, enters the polarization beam splitter 23, and is split into the P-polarized light and the S-polarized light by a dielectric multilayer coating 23a of the polarization beam splitter 23. The P-polarized light transmits through the dielectric multilayer coating 23a, while the S-polarized light is reflected to be removed at the dielectric multilayer coating 23a. After passing through the dielectric multilayer coating 23a, the P-polarized light passes through the quarter wavelength plate 24 which is provided at the plane of incidence and exit of the polarization beam splitter 23. When passing through the quarter wavelength plate 24, linearly polarized light becomes circularly polarized light through a process where respective phases of two vertically crossing polarized components are mutually shifted by one-fourth of wavelength. This circularly polarized light reaches a concave reflection mirror 26 after being diffused at a second group of lenses 25.

The circularly polarized light which has reached the concave reflection mirror 26 is reflected there, and becomes reversely circulating light. This light is transmitted through a second group of lenses 25 and arrives at the quarter wavelength plate 24. The quarter wavelength plate 24 shifts the phase of the polarized component of reflected light from the reflection mirror 26 to the opposite direction by one-fourth of wavelength. As a result, circularly polarized light is transformed to S-polarized light.

The acquired polarized light S reaches the polarization beam splitter 23, is reflected by the dielectric multilayer coating 23a, and emanates from the polarization beam splitter 23. The emanating light from the polarization beam splitter 23 is converged on the second plane 28 by the third group of lenses 27, and the pattern on the first plane 21 is minified and projected on the second plane 28.

It is well known that astigmatism occurs due to thickness of commonly used quarter wavelength plates made of crystal. The quantity of astigmatism is expressed by the following equation (1), assuming that wavefront aberration is W.

$$W = (no - ne)d \times \theta^2 \qquad (1)$$

In equation (1), (no−ne) is the difference between refractive index no of ordinary ray and refractive index ne of extraordinary ray, d is the thickness of a quarter wavelength plate, and θ is shear angle from parallel light inside the wavelength plate, namely, divergence (convergence) angle of ray.

As explained above, wavefront aberration W depends on (no−ne)d. Thus, the astigmatism cannot be adjusted by an ordinary method of making a wavelength plate by laminating two crystals with their optical axes rotated by 90 degrees.

In contrast with this, the quarter wavelength plate 24 of the present invention is constituted so that (no−ne)d becomes one-fourth of wavelength. Thus, the value of W becomes one-fourth wavelength or less in such a wide range under θ of 45 degrees by making [(no−ne) d=one-fourth of wavelength].

As described above, by using an obliquely deposited film element as shown in the first embodiment, it is possible in the second embodiment to maintain sufficient imaging performance on the second plane 28. Also, the obliquely deposited film element (quarter wavelength plate 24) has a low loss ratio, even for shortwave light with a wavelength≦450 nm as described in the first embodiment (see FIG. 5). Accordingly, it can be applied to minute elements such as an exposure device for semiconductor elements, which require the wavelength of origin light to be shortened.

Third Embodiment

Explained below is an example of using an obliquely deposited film element of the first embodiment as a phase plate in a different optical device from the second embodiment (for example, quarter wavelength plate).

Figure 7:
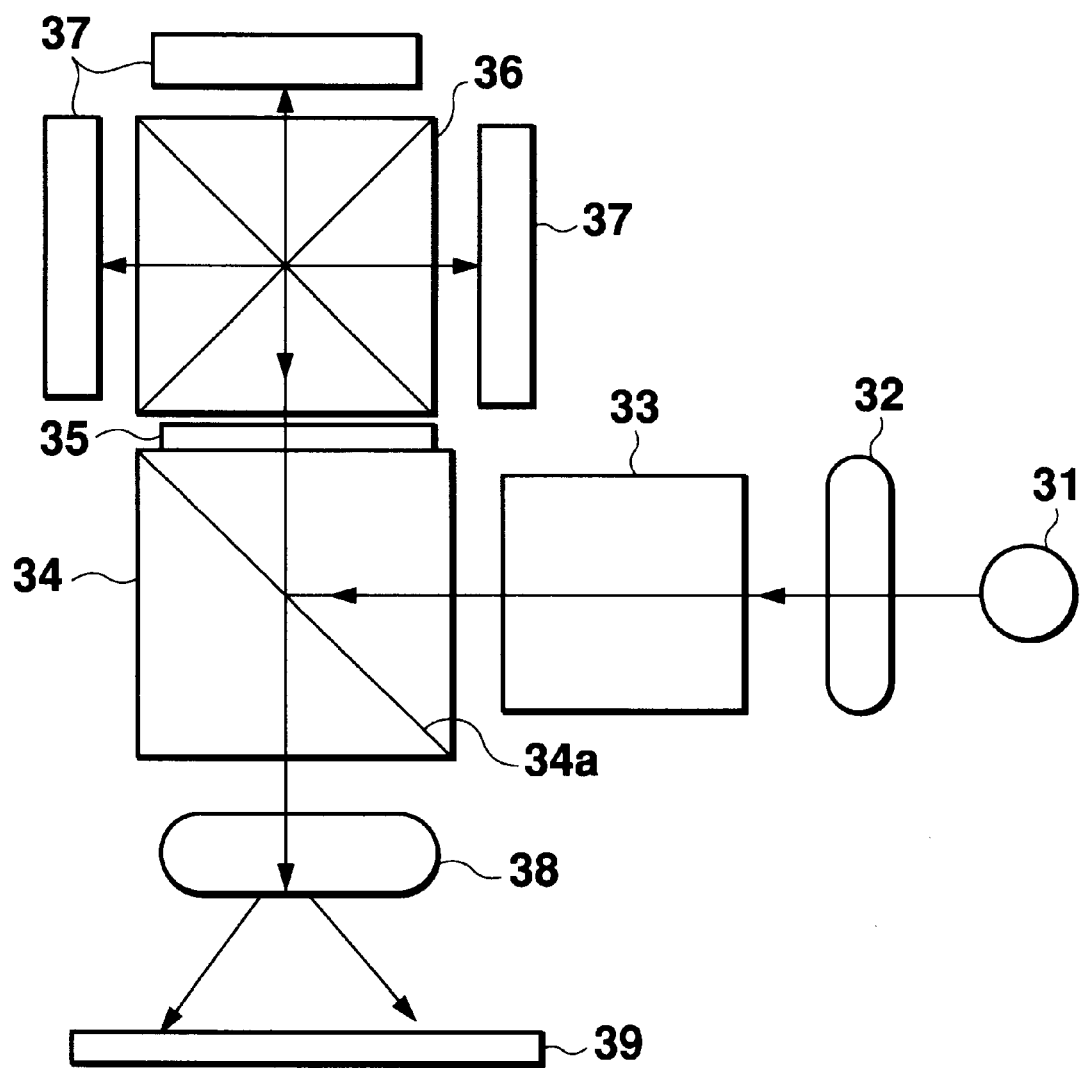
FIG. 7 shows an example of the constitution of an optical device according to a third embodiment of the present invention.

FIG. 7 shows an example of using the obliquely deposited film element of the present invention in an optical device which is shown in Japanese Patent Laid-Open Publication No. Hei 6-289222(JPA 6-289222). This optical device is an optical system of a projection display device in which an image on the light valve 37 is projected on the screen 39 by irradiating the light from a light source 31 to a reflective light valve 37, for example a liquid crystal display panel (LCD panel). The obliquely deposited film element shown in the first embodiment is used as a quarter wavelength plate 35 between the polarization beam splitter 34 and the dichroic prism 36 in order to improve the contrast of projected images on the screen 39.

An outline of the projection display device of FIG. 7 will be subsequently described.

In FIG. 7, the origin light emanated from the light source 31 enters into the main polarization beam splitter 34 as a linearly polarized light via a first group of lenses 32 and a previously arranged polarization beam splitter 33. Although the ray of light is drawn with one line for the sake of simplification in FIG. 7, the actual ray of light is not only parallel but also diagonal to the surface of a paper, as the light enters into the main polarization beam splitter 34 approximately at five degrees of converging and luminous flux. The S-polarized component of linearly polarized light from the light source 31 is reflected at the dielectric multilayer coating 34a of the main polarization beam splitter 34, and this reflected light reaches the quarter wavelength plate 35 which is provided on the side of dichroic prism 36 of the main polarization beam splitter 34. At that moment, the fast axis and slow axis of the quarter wavelength plate 35 are arranged within the plane of the quarter wavelength plate 35 vertically and parallel to the paper surface, respectively. When the reflected light enters into the dichroic prism 36, respective phases of two polarized components of the reflected light which are orthogonal to each other are shifted by a quarter wavelength.

The dichroic prism 36 resolves reflected light into light of three colors, namely, red, green, and blue light, and this light is irradiated from each side to three reflective light valve 37 corresponding to red, green, and blue. Each reflective light valve 37 modulates incident light according to respective images displayed, and then emanates the modulated light as reflected light of elliptically polarized light. The dichroic prism 36 synthesizes the reflected light from the light valve 37, and emanates the synthesized light to the main polarization beam splitter 34. The light again passes through the quarter wavelength plate 35. By passing through the quarter wavelength plate 35 twice, light which is advancing not parallel to the surface of paper becomes elliptically polarized light (linearly polarized light if the light valve is off) whose direction to an axis being orthogonal to both the fast axis and the slow axis is opposite to the direction at the time of the first passage, and the elliptically polarized light enters into the main polarization beam splitter 34. Consequently, the main polarization beam splitter 34 can be used as the most suitable analyzer, whereby it is possible to improve contrast among images projected on the screen 39.

The P-polarized component of linearly polarized incident light transmits a dielectric multilayer coating 34a of the main polarization beam splitter 34. The component is then projected onto the screen 39 so that a desired color image is projected on the screen 39.

Heretofore, a quarter wavelength plate made of a high molecular film was used as the quarter wavelength plate 35 in the optical system described above.

However, high molecular films have poor heat-resistance. Therefore, high luminance incident light damages a quarter wavelength plate made of such a film. There is a demand at present for enhancement of the contrast of images on the screen 39 which leads to the improvement in quality of display. Therefore, higher luminance light sources are increasingly used. Further, it is pursued to reduce a loss of light in other optical members, such as a LCD light valve 37 as much as possible. Under the circumstances, quantity of the incident light into the quarter wavelength plate 35 is increased. Accordingly, a wavelength plate which has small light loss and a high heat resistance is required.

A quarter wavelength plate made of a high molecular film has a rough surface as compared with the polished surface of a glass or the like. The surface roughness causes turbulence of a wave front of transmitted light and resultantly deteriorates resolution of a projection display device.

In contrast, as an obliquely deposited film element comprising an inorganic substance as shown in the first embodiment is used as the wavelength plate 35 in the third embodiment, its heat-resistance is remarkably improved and it is applicable to a high luminance projection display device.

As for the problem of deterioration of resolution, for example, by employing the obliquely deposited film element of the first embodiment formed on a polished surface of a prism substrate, as a quarter wavelength plate a smooth surface can be easily obtained, whereby resolution is not deteriorated and it is not necessary to increase parts in number.

Further, maximization of various optical elements in size may be requested from now on with the progress of such maximization of devices, especially the maximization of projected images or the light valve 37. As large and uniform wavelength plates can be easily produced by deposition, the present invention can easily correspond to the maximization of the area, which is difficult to attain in the case of a wavelength plate made of crystal (quartz).

While there have been described what are at present considered to be preferred embodiments of the invention, it will be understood that various modifications maybe made thereto, and it is intended that the appended claims cover all such modifications as fall within the true spirit and scope of the invention.

What is claimed is:

1. An obliquely deposited film element comprising:

a substrate; and alternately deposited layers on the substrate, the alternately deposited layers being an obliquely deposited layer and a normally deposited layer with respect to the substrate without special orders, the uppermost layer of the alternately deposited layers being the normally deposited layer, provided that the lowermost layer of the alternately deposited layers is the obliquely deposited layer.

2. The obliquely deposited film element according to claim 1, wherein said obliquely deposited layer and said normally deposited layer comprise at least one material selected from the group consisting of tantalum oxide, cerium oxide, tungsten oxide, silicon oxide, and neodymium fluoride.

3. The obliquely deposited film element according to claim 1, wherein said obliquely deposited layer is formed at a deposition angle of 30 to 80 degrees with respect to the normal of the substrate.

4. The obliquely deposited film element according to claim 1, wherein said obliquely deposited layer and said normally deposited layer comprise at least one material selected from the group consisting of tantalum oxide, cerium oxide, tungsten oxide, silicon oxide, and neodymium fluoride, and said obliquely deposited layer is formed at a deposition angle of 30 to 80 degrees to the normal of the substrate.

5. An optical device using an obliquely deposited film element as a phase control element, wherein said obliquely deposited film element comprises:

a substrate; and alternately deposited layers on the substrate, the alternately deposited layers being an obliquely deposited layer and a normally deposited layer with respect to the substrate without special orders, the uppermost layer of the alternately deposited layers being the normally deposited layer, provided that the lowermost layer of the alternately deposited layers is the obliquely deposited layer.

6. The optical device according to claim 5, wherein said optical device is an optical system with functions of reflection, refraction, minification and projection.

7. The optical device according to claim 5, wherein said optical device is an optical system of a projection display device.

8. An obliquely deposited film element comprising:

a substrate; and alternately deposited layers on the substrate, the alternately deposited layers being at least two obliquely deposited layers and at least two normally deposited layers with respect to the substrate without special orders, the uppermost layer of the alternately deposited layers being a normally deposited layer, provided that the lowermost layer of the alternately deposited layers is an obliquely deposited layer.

9. The obliquely deposited film element according to claim 8, wherein one or more of said at least two obliquely deposited layers and one or more of said at least two normally deposited layers comprise at least one material selected from the group consisting of tantalum oxide, cerium oxide, tungsten oxide, silicon oxide and neodymium fluoride.

10. The obliquely deposited film element according to claim 8, wherein one or more of said at least two obliquely deposited layers are formed at a deposition angle of 30 to 80 degrees to the normal of the substrate.

11. The obliquely deposited film element according to claim 8, wherein one or more of said at least two obliquely deposited layers and one or more of said at least two normally deposited layers comprise at least one material selected from the group consisting of tantalum oxide, cerium oxide, tungsten oxide, silicon oxide, and neodymium fluoride, and one or more of said at least two obliquely deposited layers are formed at a deposition angle of 30 to 80 degrees to the normal of the substrate.

12. An optical device using an obliquely deposited film element as a phase control element, wherein said obliquely deposited film element comprises:

a substrate; and alternately deposited layers on the substrate, the alternately deposited layers being at least two obliquely deposited layers and at least two normally deposited layers with respect to the substrate without special orders, the uppermost layer of the alternately deposited layers being a normally deposited layer, provided that the lowermost layer of the alternately deposited layers is an obliquely deposited layer.

13. The optical device according to claim 12, wherein said optical device is an optical system with functions of reflection, refraction, minification, and projection.

14. The optical device according to claim 12, wherein said optical device is an optical system of a projection display device.

* * * * *